(12) United States Patent
Van de Wal et al.

(10) Patent No.: US 10,092,465 B2
(45) Date of Patent: Oct. 9, 2018

(54) CASTER WHEEL ASSEMBLY AND WHEELCHAIR COMPRISING THE SAME

(71) Applicant: Permobil AB, Timrå (SE)

(72) Inventors: Herbert Van de Wal, Alnö (SE); Erik Kalf, Matfors (SE); Urban Lind, Alnö (SE); Benny Tenggren, Sundsvall (SE)

(73) Assignee: PERMOBIL AB (SE)

( * ) Notice: Subject to any disclaimer, the term of this patent is extended or adjusted under 35 U.S.C. 154(b) by 0 days.

(21) Appl. No.: 15/601,420

(22) Filed: May 22, 2017

(65) Prior Publication Data

US 2017/0340494 A1 Nov. 30, 2017

(30) Foreign Application Priority Data

May 27, 2016 (EP) .................................... 16171762

(51) Int. Cl.
*B60B 33/00* (2006.01)
*A61G 5/10* (2006.01)
*A61G 5/04* (2013.01)

(52) U.S. Cl.
CPC ................ *A61G 5/10* (2013.01); *B60B 33/00* (2013.01); *B60B 33/0007* (2013.01);
(Continued)

(58) Field of Classification Search
CPC ..... Y10T 16/182; Y10T 16/19; Y10T 16/202; Y10T 16/204; Y10T 16/205; Y10T 16/196; Y10T 16/186; Y10T 16/01; Y10T 16/203; B60B 33/00; B60B 33/002; B60B 33/007; B60B 33/005; B60B 33/0039; B60B 33/049; B60B 33/0057; B60B 33/0068;
(Continued)

(56) References Cited

U.S. PATENT DOCUMENTS 1,922,099 A * 8/1933 Kilian ................. B60B 33/0002
16/38
2,188,648 A * 1/1940 Bouvier ................ B60B 33/021
16/21
(Continued)

FOREIGN PATENT DOCUMENTS

DE 10106688 A1 9/2002

OTHER PUBLICATIONS

European Search Report for Application No. 16171762.4, filed May 27, 2016, dated Nov. 8, 2016, 7 pages.

*Primary Examiner* — Chuck Y Mah
(74) *Attorney, Agent, or Firm* — McAndrews, Held & Malloy, Ltd.

(57) ABSTRACT

The present disclosure relates to a caster wheel assembly (1) for a wheelchair, comprising: a caster housing (3), a central body (9) having a radially outwards extending flange (9a), which central body (9) is configured to be received by the caster housing (3), a spindle shaft (23) configured to be rotationally locked relative to the central body (9), a first bearing (11) having an inner bearing race (11b) configured to be rotationally locked relative to the spindle shaft (23), a friction member (13; 11a) configured to be rotationally locked relative to the caster housing (3), and a resilient member (15) configured to be arranged between the flange (9a) and the friction member (13), and configured to provide a force between the flange (9a) and the friction member (13) to thereby create friction torque between the caster housing (3) and the spindle shaft (23).

12 Claims, 4 Drawing Sheets

(52) U.S. Cl.
CPC .......... B60B 33/0068 (2013.01); *A61G 5/041* (2013.01); *B60B 33/0005* (2013.01); *B60B 33/006* (2013.01); *B62B 2301/04* (2013.01); *B62B 2301/0465* (2013.01)

(58) Field of Classification Search
CPC ............ B60B 2200/22; B60B 2301/04; B60B 2301/0465; B60B 33/006; A61G 5/1907; A61G 5/10; A61G 5/02; A61G 5/041
See application file for complete search history.

(56) References Cited

U.S. PATENT DOCUMENTS

| | | | | |
|---|---|---|---|---|
| 2,891,273 | A * | 6/1959 | Hutchinson | B60B 33/0002 16/20 |
| 3,327,343 | A * | 6/1967 | Thresher | B60B 33/0002 16/31 R |
| 4,512,941 | A * | 4/1985 | von Seggern | H01G 7/023 264/435 |
| 4,722,114 | A * | 2/1988 | Neumann | B60B 33/021 16/35 R |
| 4,918,783 | A * | 4/1990 | Chu | B60B 33/04 16/19 |
| 4,969,232 | A * | 11/1990 | Michel | B60B 33/0002 16/350 |
| 5,167,048 | A | 12/1992 | Geiger | |
| 6,944,910 | B2 | 9/2005 | Pauls | |
| 2005/0028319 | A1 * | 2/2005 | Schreiber | A61G 5/10 16/28 |
| 2011/0221162 | A1 * | 9/2011 | Ludovici | A61G 5/10 280/250.1 |

* cited by examiner

CASTER WHEEL ASSEMBLY AND WHEELCHAIR COMPRISING THE SAME

CROSS-REFERENCE TO RELATED APPLICATIONS/INCORPORATION BY REFERENCE

The present application claims priority to European Patent Application No. 16171762.4, filed May 27, 2016. The content of the above-identified application is hereby incorporated herein by reference in its entirety.

TECHNICAL FIELD

The present disclosure generally relates to wheelchairs. In particular, it relates to a caster wheel assembly for a wheelchair and to a wheelchair comprising a caster wheel assembly.

BACKGROUND

Wheelchairs are generally provided with a pair of non-swivelling wheels, such as drive wheels in the case of powered wheelchairs. Wheelchairs may also be provided with caster wheels, in particular swivel caster wheels facilitating rotation of the wheelchair in any direction.

Caster wheels of the type that swivel are known to flutter or to shimmy. Flutter or shimmy occurs when a caster wheel starts to oscillate side-to-side. In the case of flutter, the side-to-side oscillation is obtained by forced oscillation and in case of shimmy by self-excited oscillation. These side-to-side oscillations are highly undesirable because the direction of orientation of the caster wheel becomes uncontrollable. Further, the oscillations may give rise to vibrations in the seat which may be experienced as uncomfortable for the user. Normally oscillation occurs when the wheel is not in full contact with the ground, and the wheel may have turned in any direction when full ground contact is regained. Oscillations may also occur without the caster wheels losing contact with ground in case the wheelchair speed is sufficiently high.

There are a number of methods of reducing flutter and shimmy. U.S. Pat. No. 6,944,910, for example, discloses a caster wheel assembly for a wheelchair, including a housing, a caster fork configured to mount a caster wheel for rotation, and a caster bolt connected to the caster fork and inserted into the housing for rotation within the housing. The assembly also includes a damping insert applying a biasing force between the caster bolt and the housing to dampen rotation of the caster bolt with respect to the housing. The damping insert comprises a plurality of generally stiff but somewhat flexible discs. The discs are substantially flat, with major faces oriented substantially vertically. The discs are sufficiently stiff so that they resist bending. When the discs are inserted into the annular space between the caster bolt and the housing, their horizontal dimension exceeds the maximum chord length within the annular space, and the discs must be bent in order to fit into the space. This bending creates a biasing force between the rotatable spacer and the non/rotating housing, and the biasing force dampens the rotation of the spacer and the bolt with respect to the housing. The damping insert hence reduces caster wheel oscillations by means of friction.

SUMMARY

Due to the vertical contact regions between the discs and the housing, which provide the damping effect, it is difficult to control the amount of frictional force provided by the damping insert.

In view of the above, a general object of the present disclosure is to provide a caster wheel assembly which solves or at least mitigates the problems of the prior art.

There is hence according to a first aspect of the present disclosure provided a caster wheel assembly for a wheelchair, comprising: a caster housing, a central body having a radially outwards extending flange, which central body is configured to be received by the caster housing, a spindle shaft configured to be rotationally locked relative to the central body, a first bearing having an inner bearing race configured to be rotationally locked relative to the spindle shaft, a friction member configured to be rotationally locked relative to the caster housing, and a resilient member configured to be arranged between the flange and the friction member, and configured to provide a force between the flange and the friction member to thereby create friction torque between the caster housing and the spindle shaft.

Frictional torque is provided as a result of horizontal contact between the components of the caster wheel assembly, in particular due to the force provided by the resilient member between the radially outwards extending flange and the friction member, which are spaced apart along the rotational axis of the spindle shaft. It is thus ensured that the horizontal contact is maintained constantly over time. It can therefore always be assured that the caster wheel oscillations or shimmy can be reduced or avoided.

Another benefit is that the caster housing can be made shorter, resulting in a lower build height of the caster wheel assembly. This means that the highest point of the caster wheel assembly can be set lower than in the prior art. The risk of the caster wheel assembly colliding with e.g. parts of the seating system when the caster wheel assembly is displaced in the vertical direction during driving can thereby be reduced.

According to one embodiment the force is expansive.

One embodiment comprises an annular member configured to be rotationally locked relative to the caster housing, wherein the friction member is annular and configured to be mounted between the flange and the first bearing, and which friction member has a circumferential groove configured to receive the annular member, the friction member and the annular member being configured to be rotationally locked relative to each other.

According to one embodiment the annular member is made of rubber.

According to one embodiment the rubber is configured to provide a higher friction against the caster housing and the friction member than the resilient member is configured to provide against the friction member or the flange.

According to one embodiment the resilient member is configured to bear against the friction member and the flange.

According to one embodiment the resilient member comprises a plurality of wave washers configured to be stacked one after the other.

According to one embodiment the resilient member is a wave spring.

One embodiment comprises a second bearing having an inner bearing race and an outer bearing race, and a spacer, wherein the inner bearing race is configured to be rotationally locked relative to the spindle shaft, wherein the first bearing and the second bearing are configured to be separated axially by the spacer.

According to one embodiment the first bearing has an outer bearing race, wherein the friction member is the outer bearing race.

One embodiment comprises an annular member configured to be rotationally locked relative to the caster housing, wherein the annular member is configured to be arranged between the outer bearing race and the caster housing to rotationally lock the outer bearing race relative to the caster housing.

One embodiment comprises a caster fork configured to be mounted to the spindle shaft.

One embodiment comprises a fastener, wherein the central body has a central opening configured to receive the fastener, and wherein the spindle shaft is configured to be mounted to the central body by means of the fastener.

There is according to a second aspect of the present disclosure provided a wheelchair comprising a caster wheel assembly according to the first aspect.

According to one embodiment the wheelchair is a power wheelchair.

Generally, all terms used in the claims are to be interpreted according to their ordinary meaning in the technical field, unless explicitly defined otherwise herein. All references to "a/an/the element, apparatus, component, means, etc. are to be interpreted openly as referring to at least one instance of the element, apparatus, component, means, etc., unless explicitly stated otherwise.

BRIEF DESCRIPTION OF THE DRAWINGS

The specific embodiments of the inventive concept will now be described, by way of example, with reference to the accompanying drawings, in which.

DETAILED DESCRIPTION

The inventive concept will now be described more fully hereinafter with reference to the accompanying drawings, in which exemplifying embodiments are shown. The inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

The present disclosure relates to a caster wheel assembly that reduces flutter or shimmy. This is achieved by means of friction between components arranged in a caster housing having horizontal contact. Hereto, the caster wheel assembly has a caster housing and a central body having a radially outwards extending flange. The central body is configured to be received by the caster housing.

The caster wheel assembly also includes a spindle shaft configured to be assembled with the central body. Alternatively, the spindle shaft may be integrated with the central body. The spindle shaft is rotationally locked relative to the central body. The caster wheel assembly also includes a first bearing which has an inner bearing race that is rotationally locked relative to the spindle shaft.

Moreover, the caster wheel assembly includes a friction member and a resilient member. The friction member is configured to be rotationally locked relative to the caster housing and is arranged coaxially with the central body. The resilient member is configured to be arranged between the flange and the friction member. The resilient member is configured to provide a force between the flange and the friction member to thereby create friction torque between the caster housing and the spindle shaft. The force provided by the resilient member may be an expansive force. With expansive force is meant a force that acts to push the flange and the friction member away from each other. In this manner, the caster housing is rotatable relative to the spindle shaft with a certain amount of friction. A caster wheel is thereby able to swivel about the longitudinal axis defined by the spindle shaft.

The resilient member should be designed to provide just enough expansive force and friction torque to reduce or eliminate shimmy/flutter. The resilient member should at the same time also be designed so that the friction torque provided does not noticeably affect driveability of the wheelchair to which the caster wheel assembly is mounted.

Figure 1:
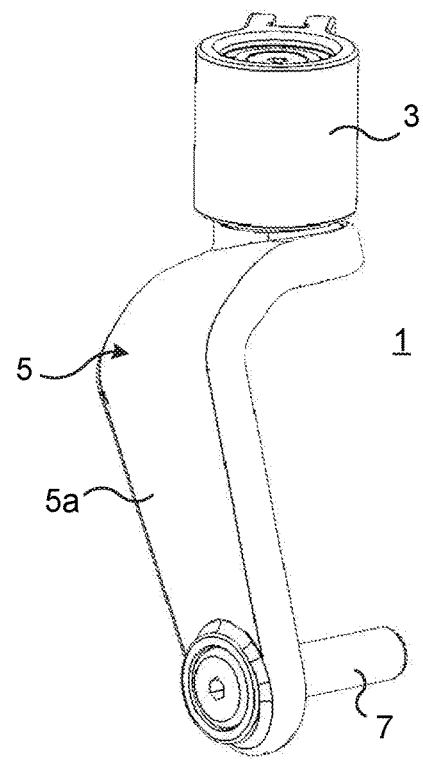
FIG. 1 shows a perspective view of an example of a caster wheel assembly for a wheelchair.

FIG. 1 shows an example of a caster wheel assembly. The exemplified caster wheel assembly 1 is configured to be mounted to the chassis of a wheelchair and comprises a caster housing 3 and a caster fork 5 which is rotatably arranged relative to the caster housing 3. The caster housing 3 is configured to be mounted to the chassis of a wheelchair. The caster fork 5 is provided with a wheel axle 7 to which a caster wheel may be mounted.

It may be noted that the exemplified caster fork 5 only has a single stem 5a; alternatively the caster fork could have two stems.

Figure 2:
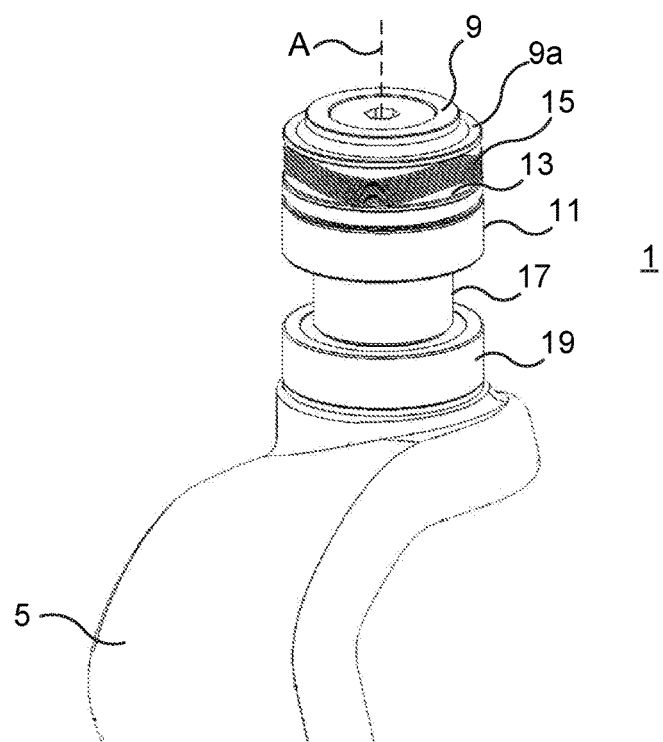
FIG. 2 shows a close-up view of the caster wheel assembly in FIG. 1 with a caster housing removed.

FIG. 2 shows a close-up view of an upper portion of the caster wheel assembly 1 with the caster housing 3 removed for the purpose of illustrating components located inside the caster housing 3. The exemplified caster wheel assembly 1 includes a central body 9, a first bearing 11, a friction member 13 and a resilient member 15. The resilient member 15 may for example be composed of a plurality of wave washers stacked one after the other, or it may be a wave spring. The resilient member may also be a viscous coupling (not illustrated).

The central body 9 has a radially outwards extending flange 9a. The friction member 13 is coaxially arranged with the central body 9, axially spaced apart from the flange 9a. With "axially spaced apart" is here meant along the rotation axis or swivel axis A of the caster wheel assembly 1. The first bearing 11 is arranged coaxially with the central body, axially spaced apart from the flange 9a. The friction member 13 is arranged between the first bearing 11 and the flange 9a. The resilient member 15 is arranged between the flange 9a and the friction member 13. The resilient member 15 is in this embodiment configured to act with an expanding force on the flange 9a and the friction member 13, as will be described in more detail in the following.

The exemplified caster wheel assembly 1 also includes a second bearing 19 coaxially arranged with the first bearing 11 and a spacer 17 arranged between the first bearing 11 and the second bearing 19.

Figure 3:
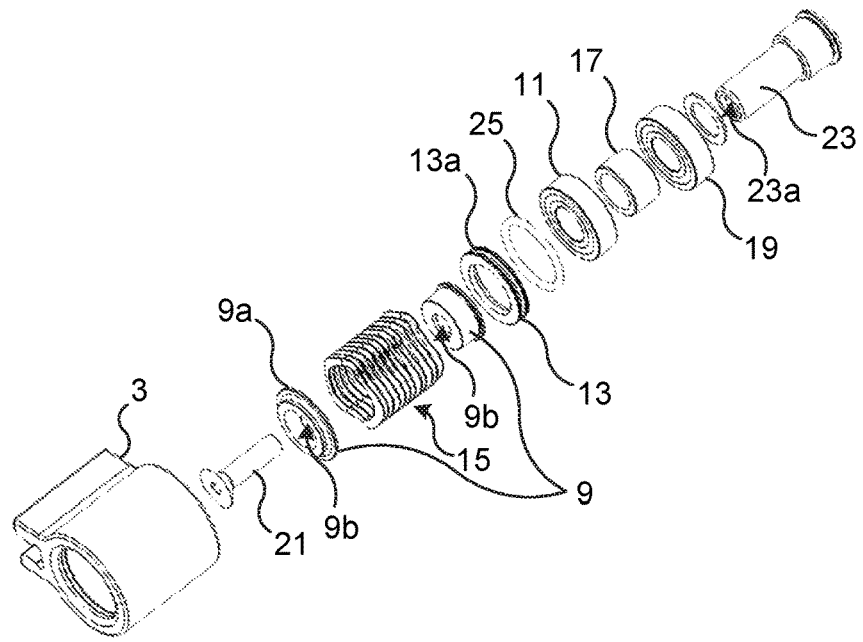
FIG. 3 is an exploded view of some of the components of the caster wheel assembly in FIG. 1.

FIG. 3 shows an exploded view of the components included in the caster housing 3 as well as the caster housing 3. The exemplified caster wheel assembly 1 in addition to the previously mentioned components includes an annular member 25, a fastener 21 and a spindle shaft 23.

The spindle shaft 23 is configured to be rotationally locked relative to the central body 9, In particular, the spindle shaft 23 is configured to be mounted to the central body 9 such that it is prevented from rotation relative to the central body 9. The fastener 21 is configured to attach the spindle shaft 23 to the central body 9. To this end, the central body 9 may have a central opening 9b, such as a through-opening, for receiving the fastener 21 and the spindle shaft 23 may also be provided with an opening 23a for receiving the fastener 21. The fastener 21 may for example be a screw provided with threads and the opening 23a of the spindle shaft 23 may be provided with corresponding threads for attaching the fastener 21 to the spindle shaft 23. The spindle shaft is configured to be attached to the caster fork 5 in a rotationally locked manner.

The exemplified friction member 13 is annular and provided with a circumferentially extending groove 13a provided along the outer periphery of the friction member 13. The groove 13a is configured to receive the annular member 25. The annular member 25 may be compressible/deformable and made of a high-friction material such as rubber. The annular member 25 has a radial dimension which allows it to extend radially beyond the friction member 13. The annular member 25 is in particular configured to be pressed against the inner surface of the caster housing 3, squeezed between the friction member 13 and the inner surface of the caster housing 3. The friction obtained between the inner surface of the caster housing 3 and the annular member 25 results in that the annular member 25 becomes rotationally locked relative to the caster housing 3. Moreover, the friction member 13 is also rotationally locked relative to the caster housing 3. This rotational locking is obtained because the friction between the annular member 25 and the friction member 13 is higher than the friction between the friction member 13 and the resilient member 15, and/or the friction between the resilient member 15 and the flange 9a. In case the friction member 13 is fixedly attached to the resilient member 15, the friction between the annular member 25 and the friction member 13 is higher than the friction between the resilient member 15 and the flange 9a.

Figure 4:
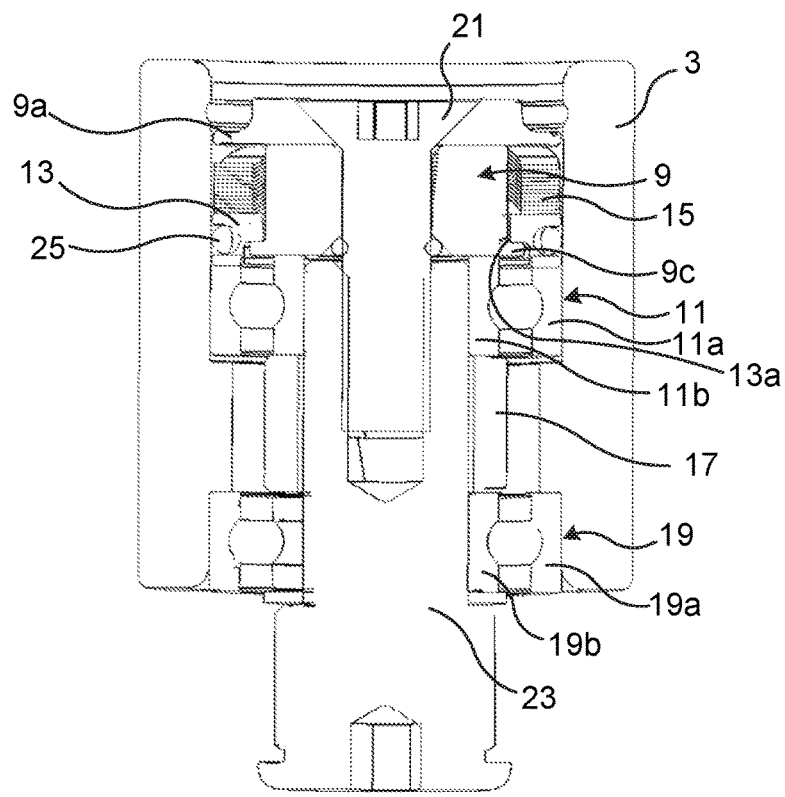
FIG. 4 is a cross-section of a caster housing and components included therein.

Turning now to FIG. 4 a cross-sectional view of the components shown in FIG. 3 is shown. The first bearing 11 has an outer bearing race 11a and an inner bearing race 11b. The inner bearing race 11b is configured to be rotationally locked relative to the spindle shaft 23. The second bearing 19 has an outer bearing race 19a and an inner bearing race 19b. The inner bearing race 19b is configured to be rotationally locked relative to the spindle shaft 23. The spacer 17 is coaxially arranged between the first bearing 11 and the second bearing 19. The utilisation of two bearings and a spacer stabilises the construction.

According to the present example, the annular member 25 and the friction member 13, which is preferably made of a high-tensile material such metal e.g. steel, are rotationally locked relative to the caster housing 3. The central body 9 and thus the spindle shaft 23 are thus configured to rotate relative to the friction member 13 and therefore also relative to the caster housing 3. The rotation between the caster housing 3 and the spindle shaft 23 is somewhat dampened due to friction torque between the resilient member 15 and the flange 9a and in the present example, due to the friction between the resilient member 15 and the friction member 13.

The exemplified central body 9 also has a second radially outwards extending flange 9c located at a proximal end of the central body 9, proximal here being with respect to the first bearing 11. The central body 9 hence has two opposing flanges, flange 9a and the second flange 9c. The second flange 9c functions as a support for the resilient member 15 in order to enable a sub-assembly part comprising the central body 9, the resilient member 15 and the friction member 13 to facilitate the assembly process. The central body 9 may also be designed without the second flange 9c.

Figure 5:
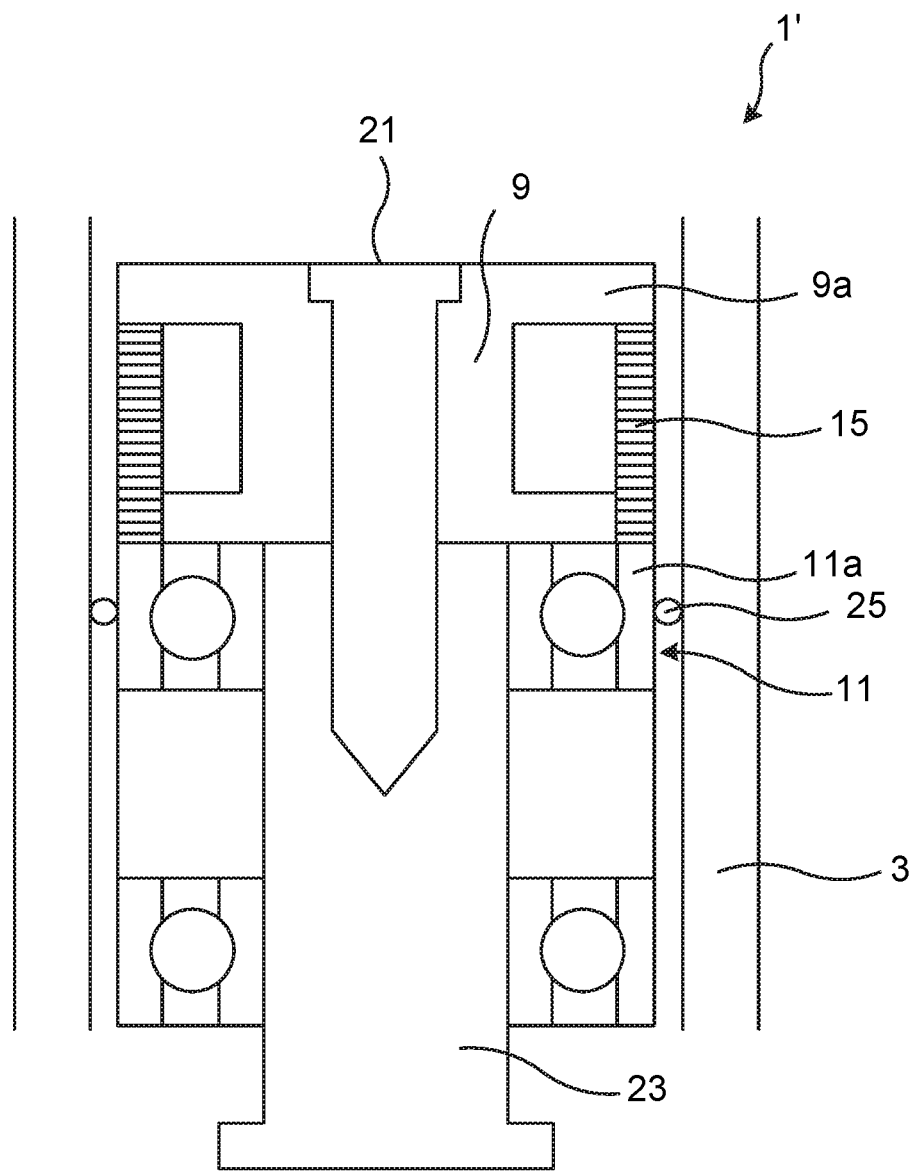
FIG. 5 schematically shows another example of a caster wheel assembly.

FIG. 5 shows another example of a caster wheel assembly. Caster wheel assembly 1' is similar to caster wheel assembly 1, except that in this example the friction member is defined by the outer bearing race 11a of the first bearing 11. The annular member 25 is according to this example provided radially in between the inner surface of the caster housing 3 and the outer surface of the outer bearing race 11a. The annular member 25 which is rotationally locked relative to the caster housing 3 hence provides friction directly onto the outer bearing race 11a which thereby becomes rotationally locked relative to the caster housing 3. The resilient member 15 is configured to extend between the flange 9a and the outer bearing race 11a. In particular, the resilient member 15 may be in direct contact with the flange 9a and the outer bearing race 11a. A frictional torque is in this case provided between the spindle shaft 23 and the caster housing 3 because of the friction between the flange 9a and the resilient member 15 and the friction between the resilient member 15 and the outer bearing race 11a.

Figure 6:
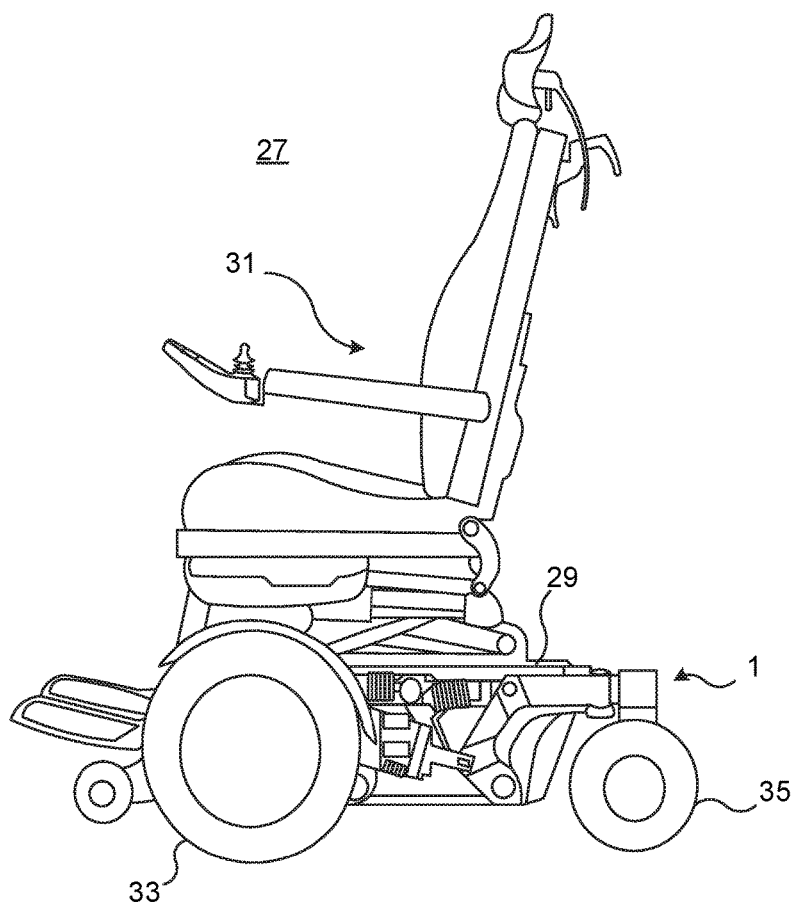
FIG. 6 schematically shows a side view of an example of a wheelchair comprising the caster wheel assembly in FIG. 1.

FIG. 6 depicts a schematic side view of an example of a wheelchair 27. The wheelchair 27 comprises a chassis 29, a seating system 31 comprising a seat and a backrest, drive wheels 33, a caster wheel assembly 1 and caster wheels 35 mounted to the caster wheel assembly 1.

The exemplified wheelchair 27 is a powered wheelchair. Hence, the wheelchair 27 comprises a battery and a motor which may be attached to the chassis 29. The battery may be electrically coupled to the motor wherein the motor is mechanically coupled to the drive wheels 33 for driving the wheelchair 27.

The exemplified wheelchair 27 is of a front wheel drive type. It should however be noted that the wheelchair could have any drive type for example midwheel drive type, rear wheel drive type, four wheel drive type or six wheel drive type. Alternatively, the wheelchair could even be a manual wheelchair, i.e. one that is not powered.

The inventive concept has mainly been described above with reference to a few examples. However, as is readily appreciated by a person skilled in the art, other embodiments than the ones disclosed above are equally possible within the scope of the inventive concept, as defined by the appended claims.

The invention claimed is:

1. A caster wheel assembly for a wheelchair, comprising:
a caster housing,
a central body having a radially outwards extending flange, which central body is configured to be received by the caster housing,
a spindle shaft configured to be rotationally locked relative to the central body,
a first bearing having an inner bearing race configured to be rotationally locked relative to the spindle shaft,
a friction member configured to be rotationally locked relative to the caster housing,
a resilient member configured to be arranged between the flange and the friction member, and configured to provide a force between the flange and the friction member to thereby create friction torque between the caster housing and the spindle shaft, and an annular member configured to be rotationally locked relative to the caster housing, wherein the friction member is annular and configured to be mounted between the flange and the first bearing, and which friction member has a circumferential groove configured to receive the annular member, the friction member and the annular member being configured to be rotationally locked relative to each other.

2. The caster wheel assembly of claim 1, wherein the force is expansive.

3. The caster wheel assembly of claim 1, wherein the annular member is made of rubber.

4. The caster wheel assembly of claim 3, wherein the rubber is configured to provide a higher friction against the caster housing and the friction member than the resilient member is configured to provide against the friction member or the flange.

5. The caster wheel assembly of claim 1, wherein the resilient member is configured to bear against the friction member and the flange.

6. The caster wheel assembly of claim 1, wherein the resilient member comprises a plurality of wave washers configured to be stacked one after the other.

7. The caster wheel assembly of claim 1, wherein the resilient member is a wave spring.

8. The caster wheel assembly of claim 1, comprising a second bearing having an inner bearing race and an outer bearing race, and a spacer, wherein the inner bearing race is configured to be rotationally locked relative to the spindle shaft, wherein the first bearing and the second bearing are configured to be separated axially by the spacer.

9. The caster wheel assembly of claim 1, comprising a caster fork configured to be mounted to the spindle shaft.

10. The caster wheel assembly of claim 1, comprising a fastener, wherein the central body has a central opening configured to receive the fastener, and wherein the spindle shaft is configured to be mounted to the central body by means of the fastener.

11. A wheelchair comprising the caster wheel assembly of claim 1.

12. The wheelchair of claim 11, wherein the wheelchair is a power wheelchair.

* * * * *